United States Patent [19]
Schmitt

[11] 3,851,302
[45] Nov. 26, 1974

[54] METHOD AND APPARATUS FOR SEISMIC DATA ACQUISITION BY SEQUENTIAL SAMPLING OF DATA

[75] Inventor: Arthur N. Schmitt, Tulsa, Okla.

[73] Assignee: Seismograph Service Corporation, Tulsa, Okla.

[22] Filed: Mar. 9, 1973

[21] Appl. No.: 339,808

[52] U.S. Cl.............. 340/15.5 TS, 179/15 AL, 340/15.5 CP, 340/183, 340/205, 325/38 B
[51] Int. Cl....... G01v 1/24, H04j 3/06, G08c 15/06
[58] Field of Search...... 340/15.5 TS, 15.5 CP, 183, 340/205; 346/33 C; 325/38 B

[56] References Cited
UNITED STATES PATENTS

| | | | |
|---|---|---|---|
| 2,803,702 | 8/1957 | Ville et al. | 325/38 B |
| 3,601,543 | 8/1971 | Marriere et al. | 340/183 |
| 3,652,979 | 3/1972 | Angelle | 340/18 CM |
| 3,748,638 | 7/1973 | Montgomery, Jr. et al. | 340/15.5 TS |
| 3,750,143 | 7/1972 | Osborne | 325/38 B |

Primary Examiner—Maynard R. Wilbur
Assistant Examiner—H. A. Birmiel
Attorney, Agent, or Firm—William F. Norris

[57] ABSTRACT

The different geophones in a linear geophone array are connected through a tracking amplifier to a single two-wire data transmission line which connects with a central recording truck. The tracking amplifiers are sampled sequentially by a series of strobing pulses transmitted along a two-wire strobing pulse transmission line. A data pulse from each tracking amplifier is switched to the data transmission line in response to each strobing pulse, the data pulses from the different tracking amplifiers are separated in time by the time required for the strobing pulse to be propagated from one geophone station to the next. Each data pulse indicates that the geophone analog signal has increased or decreased by at least a known incremental amount during the time interval since the preceding sampling time. Repetition rate of the strobing pulses is selected to permit a strobing pulse to be propagated to the end of the geophone array and for a data pulse to return from the fartherest geophone station before the onset of a succeeding strobing pulse.

11 Claims, 6 Drawing Figures

{ 3,851,302 }

METHOD AND APPARATUS FOR SEISMIC DATA ACQUISITION BY SEQUENTIAL SAMPLING OF DATA

BACKGROUND OF THE INVENTION

This invention relates to seismic exploration and more particularly to a method and apparatus for acquisition of the data output of an array of seismic vibration pickups and transmission of said data to a central recording truck having array processor, control and recording apparatus therein.

In geophysical seismic exploration, seismic waves are created at or near the earth's surface and travel downwardly into the earth formations. Upon encountering interfaces formed by different subsurface strata, portions of the seismic wave energy are reflected back towards the earth's surface where they are detected, converted to electrical signals and recorded as a function of time. After the reflected seismic energy, or echoes, have been detected, travel time of the waves can be directly related to the depths of the reflecting interfaces. It is the practice to detect the seismic wave energy, or echoes, by means of a multiplicity of vibration pickups ("geophones") disposed in a linear array along the surface of the ground. The array may comprise 24 geophone stations, where each station may comprise one or several geophones connected in series, parallel or series-parallel. Throughout the descriptions that follow, reference will be made to geophones; it should be understood however that either one or several geophones may be used at each geophone station. The present tendency is to use larger geophone arrays for greater observational accuracy, therefore geophone arrays of 48 and 96 geophone stations are sometimes used.

In the prior art, the practice is to transmit the signal from each geophone station to a central recording truck by means of individual wire circuits from each geophone station to the central recording truck. The individual wire circuits for the geophones are fabricated into a single geophone cable with the geophone cable comprising 24, 48 or 96 circuits, depending upon the equiupment used. A disadvantage of this method of signal transmission is that the geophone cable is expensive to fabricate; a further disadvantage is that the multiple wires are subject to breakage and are difficult to repair.

One prior art method of overcoming the foregoing disadvantages is disclosed in U.S. Pat. No. 3,652,979, whereby the analog signals from the different geophone stations are multiplexed onto a single two-wire transmission line by means of a series of address pulses. Each geophone in the array is switched onto the transmission line through an addressable assemblage having pulse numbering or pulse pattern coding and can be switched at times such that the analog signals therefrom arrive at the recording truck in any desired time sequence. Typical sampling rate for the system is approximately one sample per 2,000 microseconds for each geophone station, or about a 500 hertz sampling frequency.

SUMMARY OF THE INVENTION

It is the object of the present invention to provide a seismic data acquisition system having an incremental tracking amplifier at each geophone station connected to a single two-wire data transmission line and having a simplified multiplexing system whereby the data output from a large number of tracking amplifiers is transmitted sequentially on the two-wire data line.

Another object of the invention is to provide a system of the aforesaid type wherein the different geophones are connected to the data line by means of unaddressed incremental tracking amplifiers which are identical with and interchangeable with each other, and which transmit one digital data pulse (or zero) to the data line in response to a single strobing pulse.

And another objective of the invention is to provide a system of the aforesaid type wherein the different geophones are switched onto the data line in sequential order by a single strobing pulse propagated along a strobing transmission line and wherein the signals from the different geophone stations are separated in time by the propagation time of the strobing pulse along the strobing line between geophone stations.

And still another objective of the invention is to provide a system of the aforesaid type wherein the output of the incremental tracking amplifier is a digital pulse (or zero) which indicates that the geophone signal voltage has increased (or decreased) by a known incremental amount.

And yet another objective of the invention is to provide a seimic data acquisition system wherein each incremental tracking amplifier of the geophone array is sampled at a cyclical rate of once for each period of time equal to the propagation time along a two-wire transmission line extending from the recording truck to the far end of the geophone array and return.

These and other objectives are attained in accordance with the present invention by providing a seismic data acquisition system comprising a two conductor data line of a twisted two-wire pair cable type or of a coaxial cable type, a linear array of geophones, each geophone communicating with the transmission cable through an incremental tracking amplifier having a pulse operated output gate, a strobing pulse generator connected to a two-wire twisted pair or coaxial strobing line at the recording truck and timing circuitry such that the strobing pulse is transmitted along the strobing line at discrete time intervals, opening the output gate of each geophone incremental tracking amplifier sequentially so that a digital output pulse from each incremental tracking amplifier is multiplexed onto the data line at a time interval equal to the propagation delay time of the strobing pulse as it is propagated progressively along the strobing line from one geophone station to the next, the strobing line may have a terminating resistance at the far end of the geophone array from the recording truck so that the strobing pulse is absorbed thus preventing reflections from the strobing line far end from propagating back along the cable and gating the tracking amplifiers out of sequence.

The effect of the foregoing invention is to utilize the inherent propagation time of the transmission line as an element of a multiplexing system, thereby reducing the complexity of the multiplexing system by eliminating addressing codes and allowing a reduction of the number of conductors required in the geophone transmission cable.

A second effect of the invention is to permit the use of higher sampling rates than have heretofore been available thus effecting improved reproduction of the analog geophone signal.

BRIEF DESCRIPTION OF THE DRAWINGS

The accompanying drawings, given as non-restrictive examples, will enable the manner in which the invention is put into practice to be better understand. In the accompanying drawings.

DESCRIPTION OF THE PREFERRED EMBODIMENTS

Figure 1:
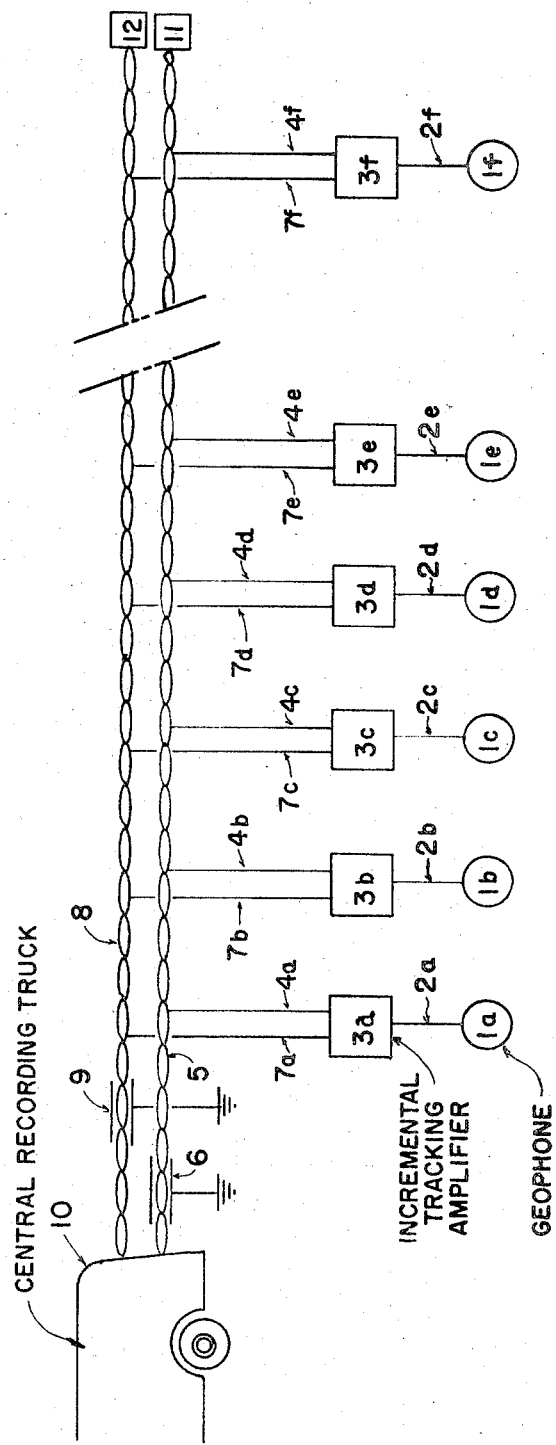
FIG. 1 shows diagrammatically a seismic data acquisition system according to the invention.

With reference now to FIG. 1, there is shown a diagrammatic illustration of a seismic data acquisition system according to the present invention. A linear array of geophones $1a$, $1b$, $1c$, $1d$, $1e$, and $1f$ is depicted. A typical linear geophone array may contain 24 geophone stations. The first geophone station $1a$ (nearest to the recording truck 10) might be typically spaced 210 feet from the second geophone station $1b$ with each succeeding geophone station $1c$, $1d$, $1e$ having an equal spacing from its preceding geophone station, with equal spacings being maintained until the last geophone station $1f$ is reached, the line of geophone stations thus defining a linear geophone array. Each of the geophones $1a$, $1b$, $1c$, $1d$, $1e$, and $1f$ communicates by means of electrical circuits $2a$, $2b$, $2c$, $2d$, $2e$ and $2f$ with an associated incremental tracking amplifier $3a$, $3b$, $3c$, $3d$, $3e$ and $3f$ respectively which is located at or near its respective geophone station. Each of the incremental tracking amplifiers $3a$, $3b$, $3c$, $3d$, $3e$ and $3f$ has associated therewith wire circuits $4a$, $4b$, $4c$, $4d$, $4e$ and $4f$ communicating with a two-wire twisted pair strobing transmission line 5 which may have grounded shield 6. Additionally, each tracking amplifier $3a$, $3b$, $3c$, $3d$, $3e$ and $3f$ has an associated two-wire output circuit $7a$, $7b$, $7c$, $7d$, $7e$ and $7f$ communicating with a two-wire twisted pair data transmission line 8 which may have a grounded shield 9. The near ends of the strobing line 5 and the data line 8 are connected to a central recording truck 10 which contains timing, control and processing units to be described below. The far end of strobing line 5, beyond the fartherest geophone station $1f$, may be terminated in an impedance unit 11 which terminates strobing line 5 with an impedance which is equal to the characteristic impedance of strobing line 5. The characteristic impedance of strobing line 5 is an inherent characteristic of the type of wire used. In a like manner, data line 8 may also be terminated at its far end with an impedance unit 12. It will be understood that other types of wire, coaxial cables for example, can be used for strobing line 5 and for data line 8. It is most convenient if strobing line 5 and data line 8 are constructed from the same type of wire or coaxial cable but it is not necessary that they be the same.

Figure 2:
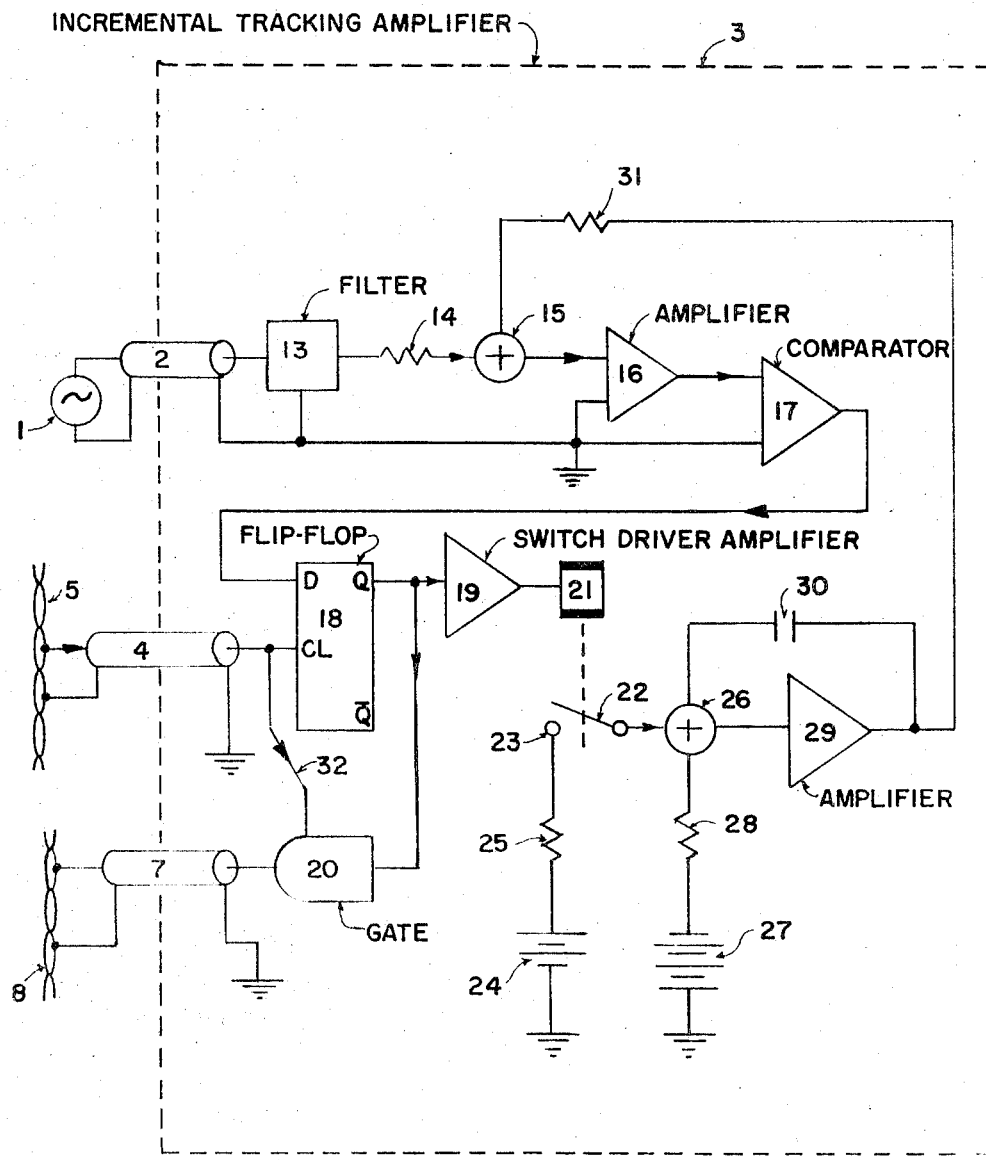
FIG. 2 shows schematically the structure of a geophone station incremental tracking amplifier.

With reference to FIG. 2, consideration will now be given to the structure and operation of a typical incremental tracking amplifier 3. A seismic signal to be recorded is detected by a geophone 1 and is converted to an electrical analog signal. The electrical analog output signal from geophone 1 is communicated to the incremental tracking amplifier 3 though electrical wire circuit 2 to an input filter 13. Input filter 13 is of a conventional low pass design having a cut-off frequency equal to one half of the sampling rate of the tracking amplifier 3 such that any frequency components of the analog signal higher than one half of the sampling frequency are suppressed. From the filter 13 the signal passes through a summing resistor 14 and to a summing point 15, the output of summing point 15 is amplififed by an amplifier 16 to a voltage level suitable for detection by a voltage comparator 17. The output of voltage comparator 17 is a "logic" voltage level and will only assume a positive or a negative value depending upon the polarity of summing point 15. The logic level output of comparator 17 then passes to the " D" input of a "delay" type flip-flop, which are well known to those skilled in the art, are such that the output "Q" can change states only when a pulse is received at the clock input "CL", the output then remains constant until a next pulse is received at the clock input. For example, if the logic level of the delay input is positive and a pulse is received at the clock input, the output of a flip-flop will assume a voltage level defined as logic level "one," and will remain in that state until the next pulse is received at the clock input, if, when the next pulse is received, the delay input is still at the positive logic level then the output will remain constant. Conversely, if during the time between the first pulse and the next pulse, the input logic level has changed to the negative level then the output of flip-flop 18 will switch to the "zero" logic level when the next pulse is received at the clock input. Thus the output of flip-flop 18 is a function of the input logic level which was present at the delay input one pulse earlier. The clock input CL of flip-lop 18 is connected by external wire circuit 4 to strobing line 5.

The output of flip-flop 18 is connected firstly to a switch driver amplifier 19 and secondly to an output gate 20. The output of switch driver amplifier 19 is electrically connected to a relay coil 21 which, in turn, is mechanically connected to a switch arm 22. When relay coil 21 is in an unactivated state corresponding to a zero logic level at the output of flip-flop 18, switch arm 22 is in an open circuit position, and when relay coil 21 is activated, switch arm 22 closes switch contact 23 thus permitting an electrical current to flow from reference bias source 24 through reference bias resistor 25 to a second summing point 26. A second bias current flows from an offset bias source 27 through offset bias resistor 28 to second summing point 26. The polarity and voltage of reference bias source 24 and of offset bias source 27 and the resistance of resistor 25 and resistor 28 are selected such that the sum of the bias currents flowing to second summing point 26 is of one polarity when switch contact 23 is closed and of the opposite polarity when switch contact 23 is open. Amplifier 29 which, with its associated feedback capacitor 30, forms an integrating circuit having an output that is proportional to the time average of the currents at second summing point 26, the current of second summing point 26. The values of resistor 25 and 28 and the values of bias source 24 and bias source 27 are selected such that if the circuit through switch arm 22 and switch contact 23 is closed for 50 percent of a given time interval and open for 50 percent of the given time interval, then the average of the output of amplifier 29 over the given time interval will be equal to zero. The output of amplifier 29 is connected to second summing point 15 through a summing resistor 31 and the bias currrents to second summing point 26 are selected such that the output of amplifier 29 is of such polarity that it tends to reduce the input to amplifier 16, at summing point 15, to zero.

The output of flip-flop 18 is connected secondly to gate 20 and thence through wire circuit 7 to data line 8. Gate 20 is controlled by a connection 32 to wire circuit 4 so that the output of flip-flop 18 is connected to data line 8 only while a pulse is present on strobing line 5.

Figure 3:
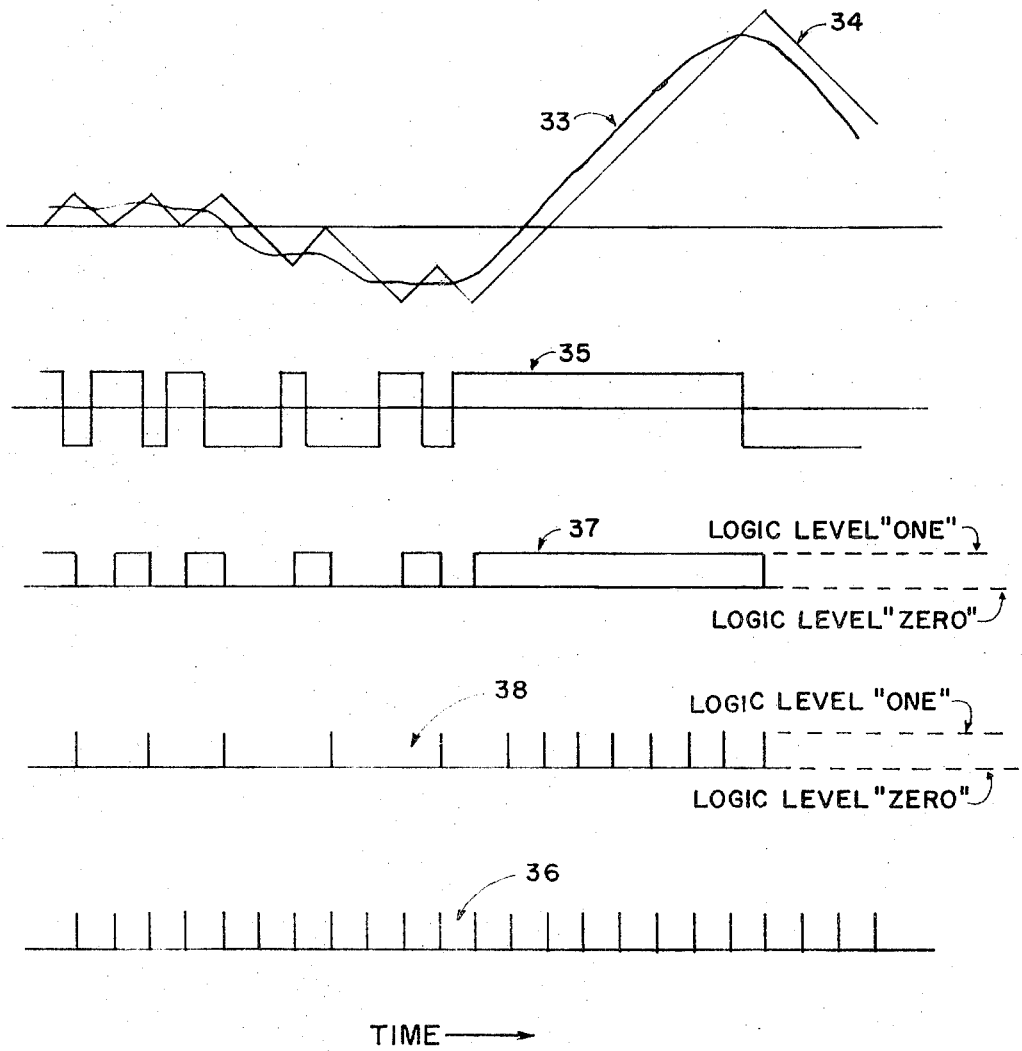
FIG. 3 illustrates the waveforms in an incremental tracking amplifier.

With reference now to FIG. 3, the operation of tracking amplifier 3 can be summarized. A filtered analog geophone voltage 33 from geophone 1 is summed at summing point 15 with an integrated voltage 34 from integrating amplifier 29. The sum (or difference) voltager at summing point 15 is detected by amplifier 16 and converted by comparator 17 to a positive or negative logic level voltgae 35 which is communicated to the delay input to flip-flop 18. When a strobing pulse 36, which occurs at uniform time intervals, is present at the clock input of flip-flop 18, the output voltage 37 of flip-flop 18 assumes a logic level of, for example, one if the analog geophone voltage 33 at summing point 15 is greater than the integrated voltage 34 from integrating amplifier 29 and zero if the geophone voltage 33 is less than the integrated voltage 34. Since flip-flop 18 can change states only when a strobing pulse 36 is present at its clock input, it can be understood that the output voltage 37 of flip-flop 18 will be held constant until the arrival of a suceeding strobing pulse 36 at which time a data pulse (or zero) is gated to data line 8 to form a series of data pulses 38.

Thus it can be appreciated that if a logic level of one is transmitted to data line 8 when a strobing pulse 36 opens gate 20 then it is known that analog geophone voltage 33 has increased by an incremental amount during the time period since the next preceding strobing pulse 36. Conversely, if a logic level zero is transmitted to data line 8, then analog geophone voltage 33 has decreased by an incremental amount during the said time period.

The voltage increment indicated by read pulses (or zeroes) 38 can be found by multiplying the slew rate, in volts per second, of amplifier 29 times the time interval, in seconds, between strobing pulses 36. If the slew rate of amplifier 29 is, for example, 3.8 volts per second and the strobing pulses have a repetition rate of 32,000 pulses per second, then the incremental voltage indicated by a one or zero read pulse is 31.25 microseconds times 3.8 volts per second equals a plus or minus 119 microvolts voltage incremental change respectively.

It will be recognized by those skilled in the art that the function of incremental tracking amplifier 3 is analagous to the well known "Delta Modulation" system, see, for example, pages 21-23, Reference Data for Radio Engineers, 5th ed., Howard W. Sams & Co., Inc.

Electrical power for operation of incremental tracking amplifiers 3 may be supplied by a central power supply unit (not shown) within the recording truck 10. Electrical power may be transmitted to the incremental tracking amplifiers 3 for example by means of a third two-wire circuit (not shown).

Figure 4:
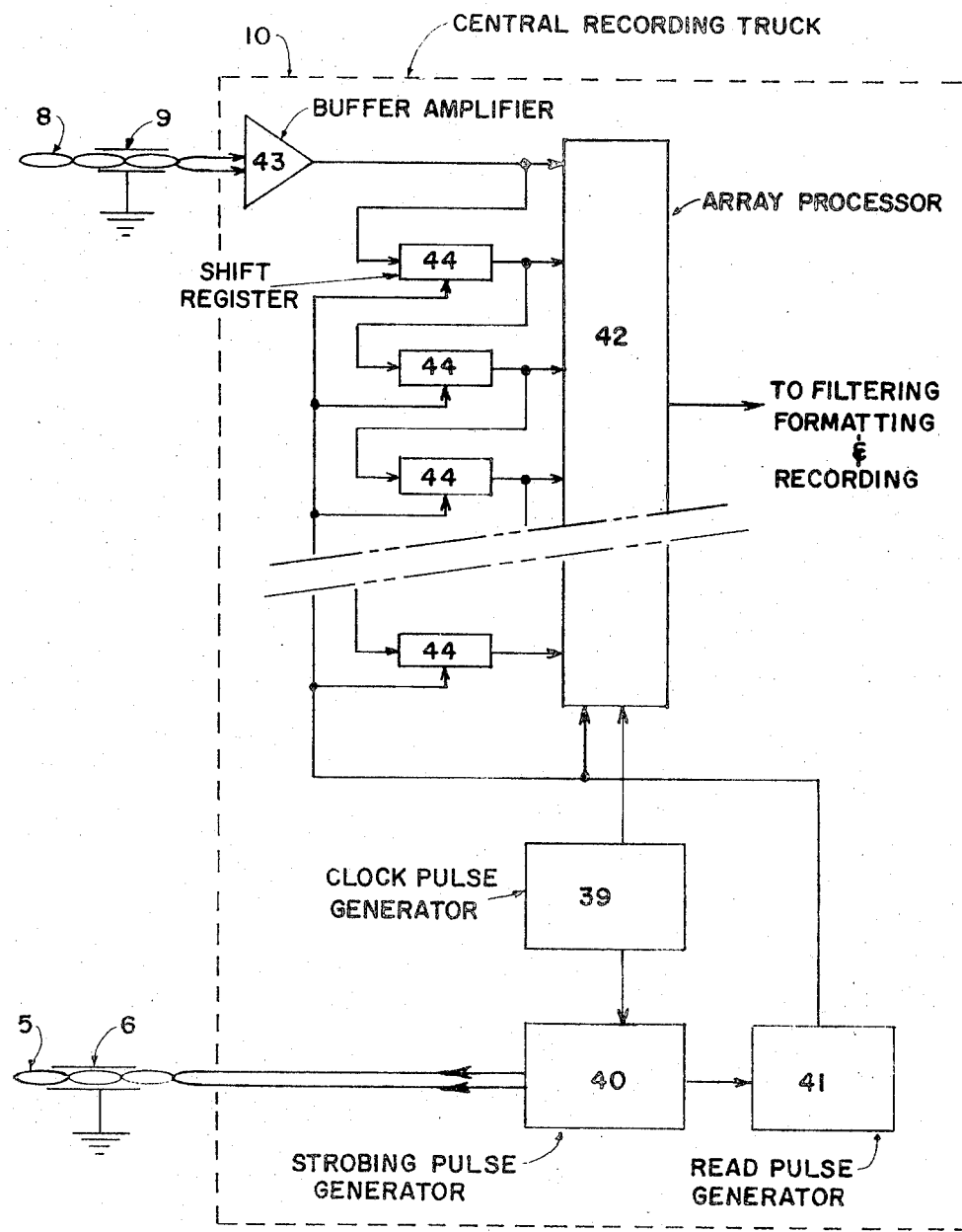
FIG. 4 shows diagrammatically the central processing and control apparatus contained in the recording truck.

With reference to FIG. 4, consideration will now be given to the functions of apparatus contained within central recording truck 10. Timing of the data acquisition system is controlled by a digital clock pulse generator 39 which supplies clock pulses to a strobing pulse generator 40 and to an array processor 42. Strobing pulse generator 40 is connected to the near end of strobing pulse line 5 and also to a read pulse generator 41. Read pulse generator 41 is electrically connected to array processor 42. Data line 8 is also connected to the inputs of array processor 42 through a buffer amplifier 43 and a chain of shift registers 44. The output of array processor 42 is connected to filtering, formatting and recording equipments (not shown).

Figure 5:
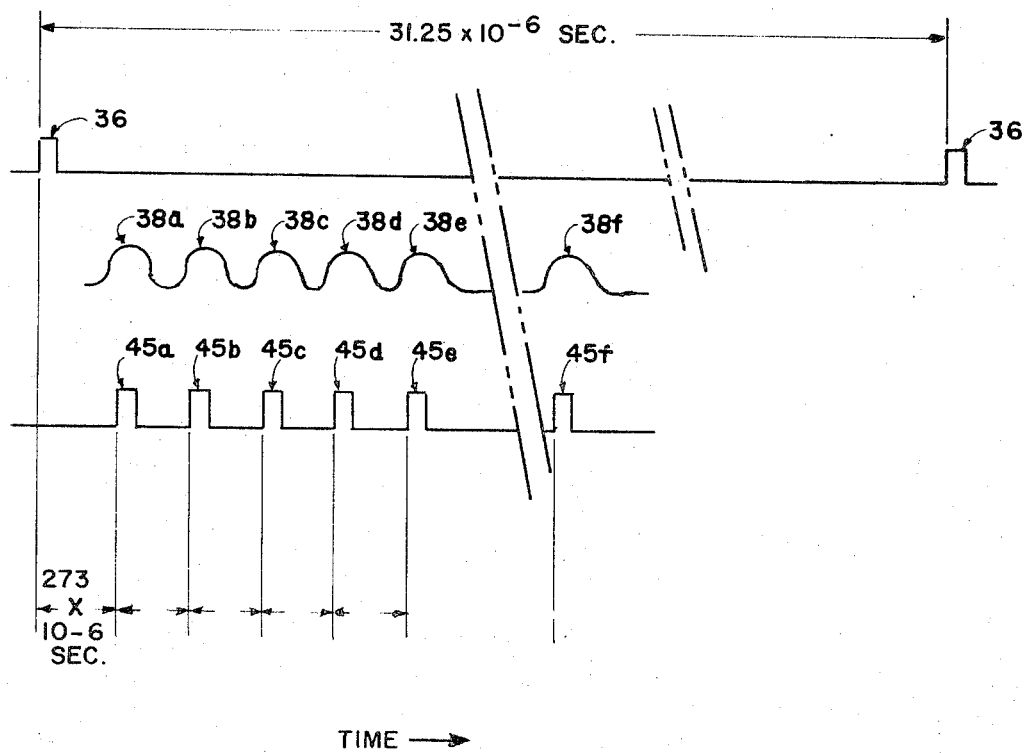
FIG. 5 illustrates the waveforms of the data acquisition system.

With reference to FIG. 5, the operation of the data acquisition system can be understood. During the time when seismic data is being recorded, a series of strobing pulses 36 is generated by strobing pulse generator 40. The strobing pulses 36 may have a pulse width of, for example $300 \times 10^{-9}$ seconds to $1000 \times 10^{-9}$ seconds. The time interval between successive strobing pulses 36 is selected to be long enough to permit a strobing pulse 36 to be propagated from the central recording truck 10 to the far end of strobing line 5 plus an equal amount of time to permit a data pulse from the farthest geophone station $1f$ to be transmitted back along data line 8 and to be received at the central recording truck 10 before the onset of the next succeeding strobing pulse 36. In summary, the time interval between strobing pulses 36 is selected to be equal to or greater than the two-way travel time required to transmit a pulse from the central recording truck 10 to the far end of strobing line 5 and return.

A strobing pulse 36 transmitted from the central recording truck 10 arrives at the first geophone station $1a$ and, in the manner described above, opens the output gate 20 of the first tracking amplifier $3a$ whereby a first data pulse $37a$ is transmitted to data line 8. At a finite time later, being the time required for strobing pulse 36 to propagate along strobing line 5 from geophone $1a$ to geophone $1b$, the strobing pulse 36 opens the output gate 20 of the second tracking amplifier $3b$ and a second data pulse $37b$ is transmitted to data line 8. In a like manner, the strobing pulse 36 opens the output gate 20 of each tracking amplifier $1c$, $1d$, $1e$ and $1f$ sequentially and a corresponding data pulse (or zero) $37c$, $37d$, $37e$ and $37f$ respectively is transmitted to data line 8. When strobing pulse 36 reaches the far end of strobing line 5 (farthest from recording truck 10) it is completely absorbed by terminating impedance unit 11 so that no reflection of strobing pulse 36 is transmitted back along strobing line 5 toward the central recording truck thus preventing untimely opening of output gates 20 of incremental tracking amplifiers 3 by reflections of strobing pulses 36 which might otherwise be propagated back along strobing line 5 towards recording truck 10. In a like manner, all data pulses 38 on data line 8 that are transmitted toward the far end (farthest from the recording truck 10) of data line 8 are absorbed when they reach terminating impedance unit 12.

In the foregoing manner, a series of digital data pulses (or zeroes) $38a$, $38b$, $38c$, $38d$, $38e$ and $38f$ is generated and transmitted along data line 8, each pulse or zero indicating an incremental increase or decrease in the geophone voltage at the geophone station from which it was transmitted. The first data pulse (or zero) 38a arrives at central recording truck 10, followed by data pulses (or zeroes) 38b, 38c, 38d, 38e and 38f, each pulse being separated in time by the travel time required for a strobing pulse 36 to be propagated between geophone stations.

Strobing pulse generator 40 is also connected to a read pulse generator 41 which delivers a series of read pulses 45a, 45b, 45c, 45d, 45e 45f to array processor 42. Onset of the first of the read pulses 45a is delayed in time to coincide with the arrival of the first data pulse 38a at array processor 42, and subsequent read pulses 45b, 45c, 45d, 45e and 45f are timed to coincide with the arrival of the subsequent data pulses (or zeroes) 38b, 38c, 38d, 38e and 38f. As each read pulse 45 is received at array processor 42 and shift register chain 44, a logic one or zero is entered into array processor 42 and shift register chain 44. A logic one or zero is entered into array processor 42 and into shift register chain 44 depending upon whether a data pulse or zero 38 is present on data line 8 when rear pulse 45 is generated. The arriving data is assembled in shift register chain 44 into parallel groups for input to array processor 42 and for subsequent filtering, formatting and recording, now shown.

The typical time values shown in FIG. 5 correspond to a geophone array having linear dimensions as shown in FIG. 1, when using identical twisted pairs, for strobing line 5 and data line 8. The propagation time delay for a twisted pair cable may be, for example, $1.3 \times 10^{-9}$ seconds per foot. It will be appreciated that other cable configurations having greater or lesser propagation delay times can be used. It will also be appreciated that other geophone spacings than that shown in FIG. 1 may be used and that changes in geophone spacing or changes to cable having other propagation delay times will require appropriate modifications to read pulse generator 41 to obtain the required read pulse spacing.

Figure 6:
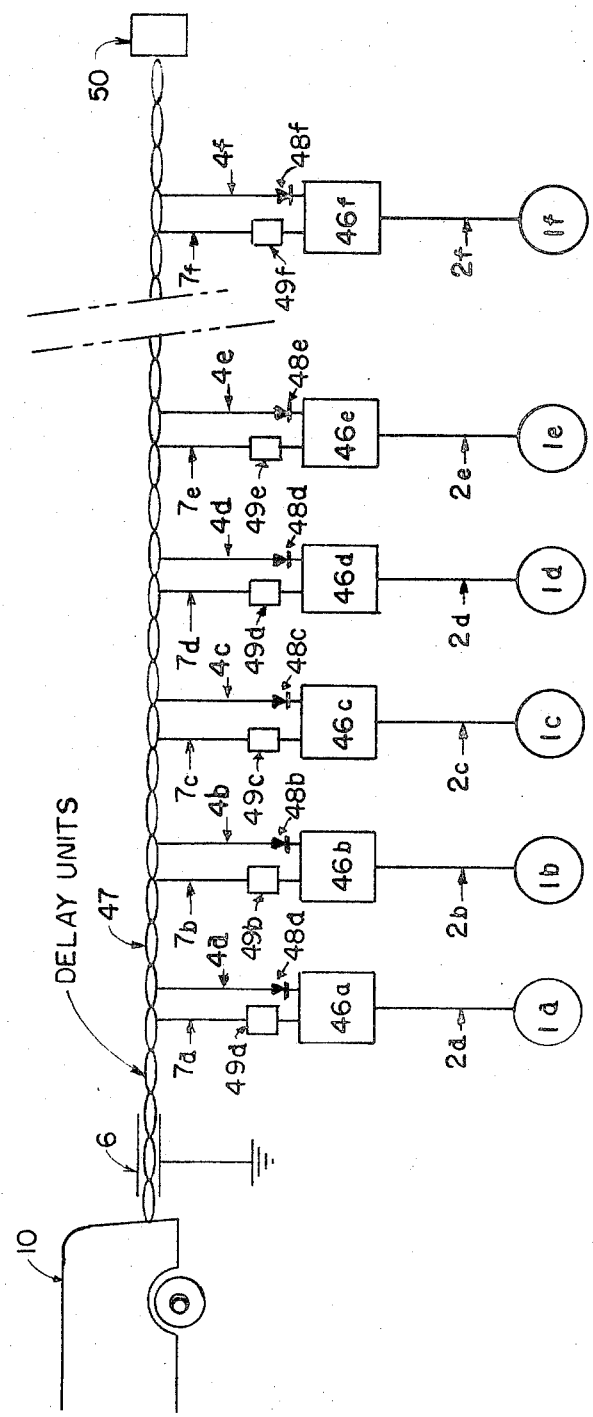
FIG. 6 shows diagrammatically a second embodiment of the invention.

With reference now to FIG. 6, a second embodiment of the invention will be described.

As before, a plurality of geophones 1a, 1b, 1c, 1d, 1e and 1f is disposed along the ground to define a linear geophone array having the same typical dimensions as shown in FIG. 1. And, as before, each of the geophones 1a, 1b, 1c, 1d, 1e and 1f communicate through an electrical circuits 2a, 2b, 2c, 2d and 2e with negative incremental tracking amplifiers 46a, 46b, 46c, 46d, 46e and 46f. Negative incremental tracking amplifiers 46 are identical to incremental tracking amplifiers 3 except that the internal wiring connections are such that the output data pulses are of negative polarity as opposed to the positive polarity data pulses 38.

Each of the amplifiers 46 has associated therewith wire circuits 4 which are connected to a combination strobing-data line 46 and to amplifiers 46 through diodes 48a, 48b, 48c, 48d, 48e and 48f. Also, as before, each amplifier has an associated output wire circuit 7a, 7b, 7c, 7d, 7e and 7f which connects to strobing-data line 47 and to amplifiers 46 through a delay unit 49a, 49b, 49c, 49d, 49e and 49f.

The operation of the embodiment of FIG. 6 is analogous to that of FIG. 1 except that the strobing pulses 36 and the data pulses 38 are transmitted, in the embodiment of FIG. 6, along a single two-wire twisted pair or coaxial combination strobing-data line 47. Diodes 48 are connected with their cathode ends toward amplifiers 46 such that only positive pulses are transmitted to amplifiers 46, thus strobing pulse 36 is transmitted to amplifier 46 as before. Output data pulses 38 of amplifiers 46 are delayed for a few nano-seconds by delay units 49 so that strobing pulse 36 can propagate a few feet along strobing-data line 47 before data pulse 38 is transmitted to strobing-data line 47. Delay units 49 may be simple lumped-constant delay lines such as are well known to those skilled in the art.

It will be readily apreciated that data pulses 38 will be propagated in both directions along strobing-data line 47 and will therefore arrive at central recording truck 10 in the same order and with the same separation in time as before. It will also be appreciated that since the data pulses 38 from amplifiers 46 are of negative polarity they will be discriminated against by diodes 48 and thus preventing untimely smampling of other amplifiers 36 in the geophone array.

And again, as beofre, strobing-data line 47 may be terminated in a terminating impedance unit 50.

Operating power for amplifiers 46 may be supplied from central recording truck 10 on the strobing-data line 47 or on a separate wire, not shown, as before.

A new and improved seismic data acquisition system has been disclosed. The system is arranged to utilize the inherent propagation delay time of transmission line as an integral part of a telemetry system thereby effecting a reduction in system components and complexity.

It will be also appreciated that the data acquisition system has the considerable advantage of achieving high sampling rates, limited only by the propagation time required to transmit strobing pulses and data pulses on a transmission line along the length of the geophone array. The high sampling rates thus achieved permit the analog geophone signal to be represented in digital form to a high degree of accuracy.

Since various changes or modifications will be apparent to those skilled in the art without departing from the inventive concepts involved, it is the aim of the appended claims to cover all such changes and modifications falling within the true spirit and scope of the present invention.

What is claimed is:

1. A seismic data acquisition system for transmission to a central recording truck of the electrical signals from different geophone stations disposed along the ground in a linear array of geophones where the seismic data acquisition system comprises:

transmission line means having one end at the central recording truck and disposed along the linear array of geophones for transmission of pulses between the central recording truck and the geophone array;

a pulse generator connected to the transmission line means at the central recording truck for generating strobing pulses at a predetermined rate, each strobing pulse being propagated on the transmission line means along the array of geophones for sequentially interrogating each geophone station from the geophone station nearest to the central recording truck to the fartherest geophone station along the array; and a plurality of incremental tracking amplifiers each characterized by having an output gate activated by a strobing pulse to provide a single output binary digit data pulse indicative of a change of the tracking amplifier input signal during a time interval defined by succeeding strobing pulses, each tracking amplifier being connected between a corresponding geophone station of the geophone array and the transmission line means whereby each tracking amplifier, starting with the tracking amplifier nearest to the recording truck and proceeding sequentially along the geophone array, transmits a data pulse to the transmission line means so that a series of data pulses is transmitted to the recording truck in an order corresponding to the distance of each tracking amplifier from the recording truck along the transmission line means.

2. A seismic data acquisition system in accordance with claim 1 wherein the strobing pulse generator is designed to generate a series of identical pulses having a pulse repetition rate such that each pulse is separated in time from its succeeding pulse by a time equal to the time required for the pulse to be propagated along the entire length of the transmission line means plus the time required to propagate a data pulse from the incremental tracking amplifier fartherest along the transmission line means from the central recording truck, along the transmission line means to the central recording truck.

3. A seismic data acquisition system in accordance with claim 1 wherein the tracking amplifier output means is an electrical gate circuit, said gate circuit having a connection to the transmission line means whereby a strobing pulse opens the gate circuit thus permitting a digital data pulse to be transmitted through said gate circuit to said transmission line means.

4. A seismic data acquisition system in accordance with claim 3 wherein the digital data pulse assumes a first logic level when the amplitude of an input signal from the geophone has increased during a preceding sampling period the time period since the arrival of the next preceding strobing pulse, and wherein the data pulse assumes a second logic level when said input signal has decreased during said time interval.

5. A seismic data acuisition system in accordance with claim 4 wherein the data pulse indicates that the geophone input signal has changed amplitude by at least a predetermined incremental amount.

6. A seismic data acquisition system in accordance with claim 1 wherein the transmission line means is a pair of two-conductor transmission lines, a first of said transmission lines being a strobing line for transmission of strobing pulses and a second of said transmission lines being a data line for transmission of data pulses.

7. A seismic data acquisition system in accordance with claim 1 wherein the transmission line means is a single two-conductor transmission line for simultaneous transmission of strobing pulses and data pulses thereon.

8. A method for transmitting digital data pulses in a seismic data acquisition system comprising the steps of:

generating strobing pulses at a central recording truck;

transmitting the strobing pulses on transmission line means from the central recording truck along a linear array of geophone stations;

digitizing an output voltage of each geophone station of the linear array in an incremental tracking amplifier connected between each geophone station and the transmission line means to form a digital data pulse, where each incremental tracking amplifier is characterized by having an output gate connected to the transmission line means and activated by a strobing pulse to provide a digital data pulse indicative of a change of the tracking amplifier input signal during a time interval defined by succeeding strobing pulses and where each tracking amplifier is activated sequentially by a strobing pulse to form a series of data pulses on the transmission line means in a sequential order corresponding to the distance of each incremental trucking amplifier along the transmission line means from the central recording truck.

9. A method for transmitting digital data pulses in accordance with claim 8 including the step of generating a series of strobing pulses having a time interval therebetween equal to the time required for the pulse to be propagated along the entire length of the transmission line means plus the time required to propagate a data pulse along said transmission line means to the central recording truck from the tracking amplifier fartherest along the transmission line means from the central recording truck.

10. A method for transmitting digital data pulses in accordance with claim 9 including the step of forming a data pulse having a first logic level when the geophone output voltage has increased during the preceding time interval, and having a second logic level when the geophone output voltage has decreased during the preceding time interval.

11. A method for transmitting digital data pulses in accordance with claim 10 including the step of forming a data pulse to indicate that the geophone voltage has changed ampltidue by at least a predetermined incremental amount.

* * * * *